United States Patent [19]

Harrison et al.

[11] Patent Number: 5,775,767
[45] Date of Patent: Jul. 7, 1998

[54] CONVERTIBLE TOP FOR A VEHICLE HAVING A REAR EGRESS

[75] Inventors: Albert W. Harrison, W. Bloomfield; George A. Corder, Romulus, both of Mich.

[73] Assignee: ASC Incorporated, Southgate, Mich.

[21] Appl. No.: 698,210

[22] Filed: Aug. 15, 1996

[51] Int. Cl.⁶ .................................................. B60J 7/12
[52] U.S. Cl. .......................................................... 296/107
[58] Field of Search ............................. 296/107, 109, 296/111–114, 106, 121, 132, 99.1, 165, 159

[56] References Cited

U.S. PATENT DOCUMENTS

| | | |
|---|---|---|
| 905,571 | 12/1908 | Pangborn . |
| 1,827,059 | 3/1931 | Woolcott . |
| 2,459,089 | 9/1949 | Orr .................................... 296/117 |
| 2,747,928 | 1/1956 | Olivier et al. ..................... 296/107 |
| 3,090,646 | 5/1963 | Johnson ............................. 296/107 |
| 3,195,549 | 7/1965 | Stevens . |
| 3,298,733 | 1/1967 | Kerby et al. .................. 296/132 X |
| 3,773,379 | 11/1973 | Loiseau ............................ 296/107 |
| 4,541,879 | 9/1985 | Kassai ........................... 296/111 X |
| 4,741,571 | 5/1988 | Godette ............................ 296/107 |
| 4,746,163 | 5/1988 | Muscat ......................... 296/107 X |
| 4,784,428 | 11/1988 | Moy et al. ........................ 296/107 |
| 4,818,009 | 4/1989 | Muscat ............................. 296/106 |
| 4,964,669 | 10/1990 | Geier ................................ 296/165 |
| 5,067,768 | 11/1991 | Fischbach ........................ 296/107 |
| 5,100,195 | 3/1992 | Patel ................................. 296/107 |
| 5,267,770 | 12/1993 | Orth et al. ....................... 296/107 |
| 5,295,722 | 3/1994 | Bonné et al. .................... 296/121 |
| 5,299,850 | 4/1994 | Kaneko et al. .................. 296/107 |
| 5,451,849 | 9/1995 | Porter et al. ................ 296/223 X |

FOREIGN PATENT DOCUMENTS

| | | | |
|---|---|---|---|
| 2267896 | 12/1975 | France ............................... 296/109 |
| 1152899 | 8/1963 | Germany .......................... 296/107 |
| 1271566 | 6/1968 | Germany .......................... 296/121 |
| 388604 | 12/1989 | Germany .......................... 296/121 |
| 4139247 | 6/1993 | Germany .......................... 296/107 |
| 6-106986 | 9/1992 | Japan . |
| 40651 | 5/1936 | Netherlands .................... 296/107 |

OTHER PUBLICATIONS

Research Disclosure 34949 Disclosed Anynymously, dated May, 1993/331, "Air Inflated Convertible Top", 1 page.

*Primary Examiner*—Dennis H. Pedder
*Attorney, Agent, or Firm*—Harness, Dickey & Pierce, P.L.C.

[57] ABSTRACT

A convertible top for a vehicle having a rear egress. The convertible top includes a dynamic rear bow which rests on a rear portion of the vehicle body and is pivotable for providing access to the rear of the vehicle.

10 Claims, 6 Drawing Sheets

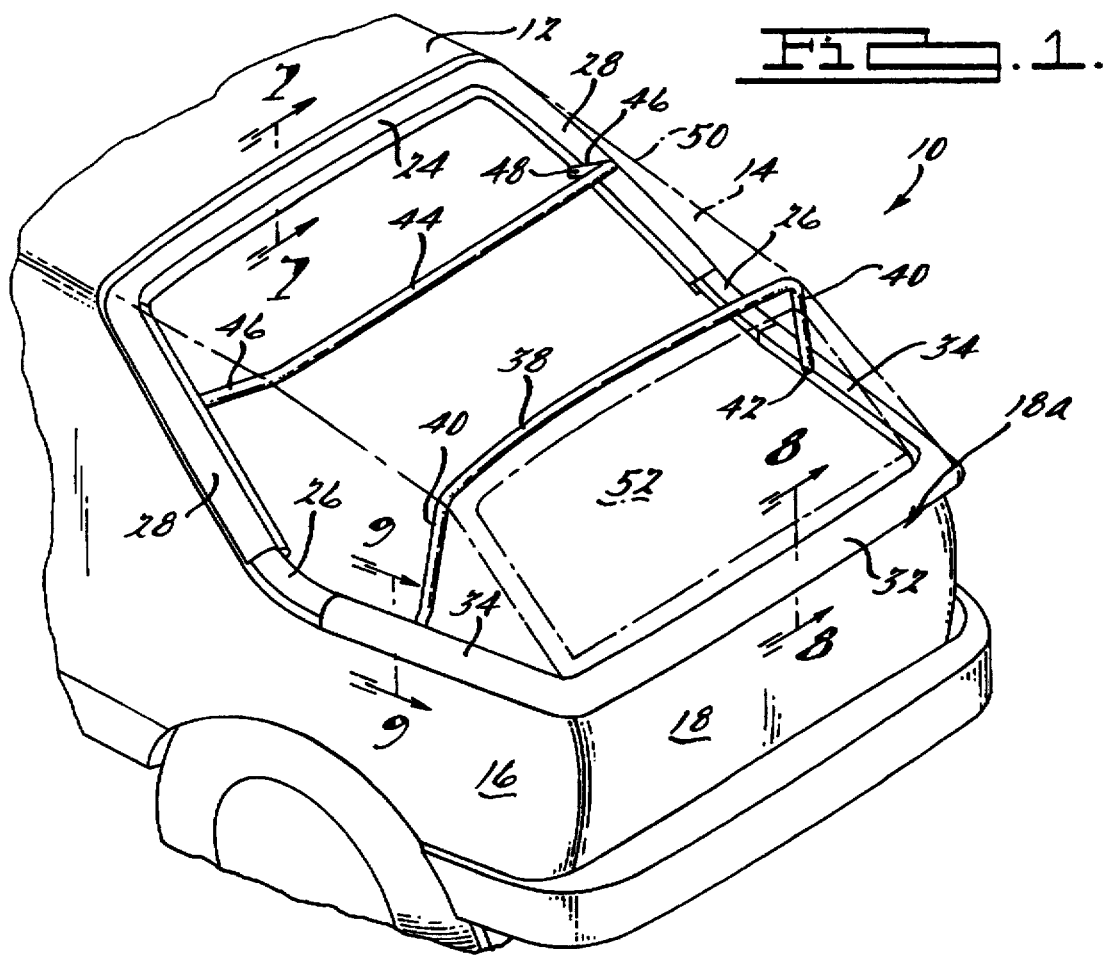
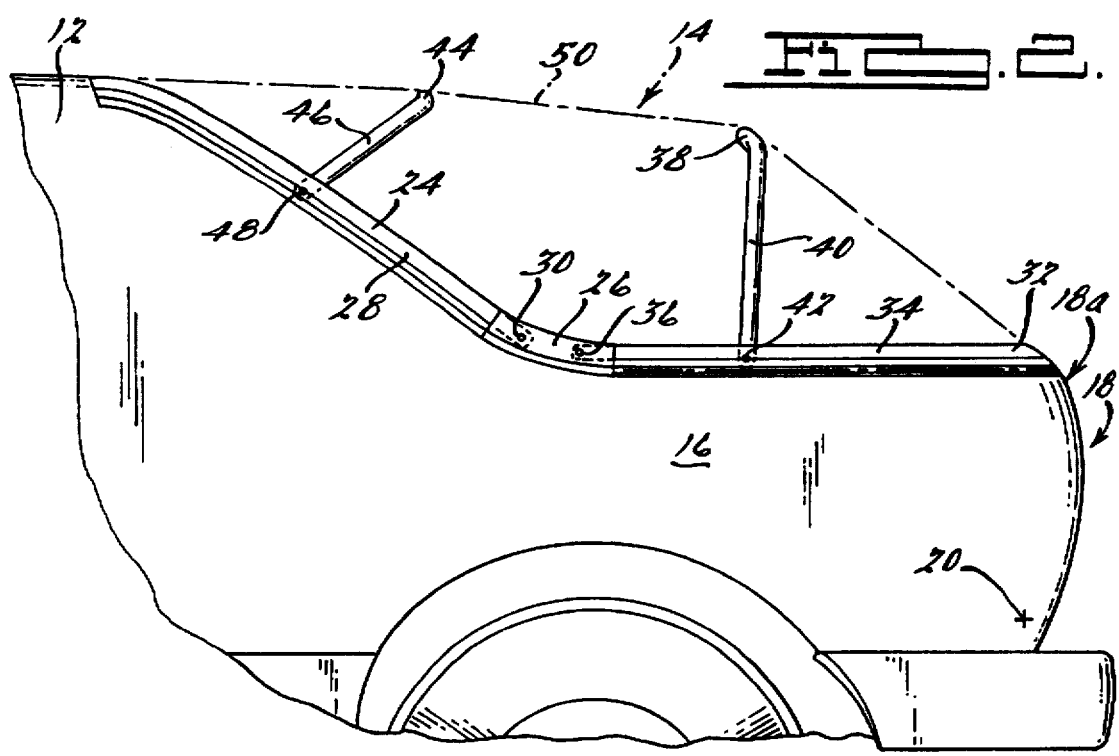

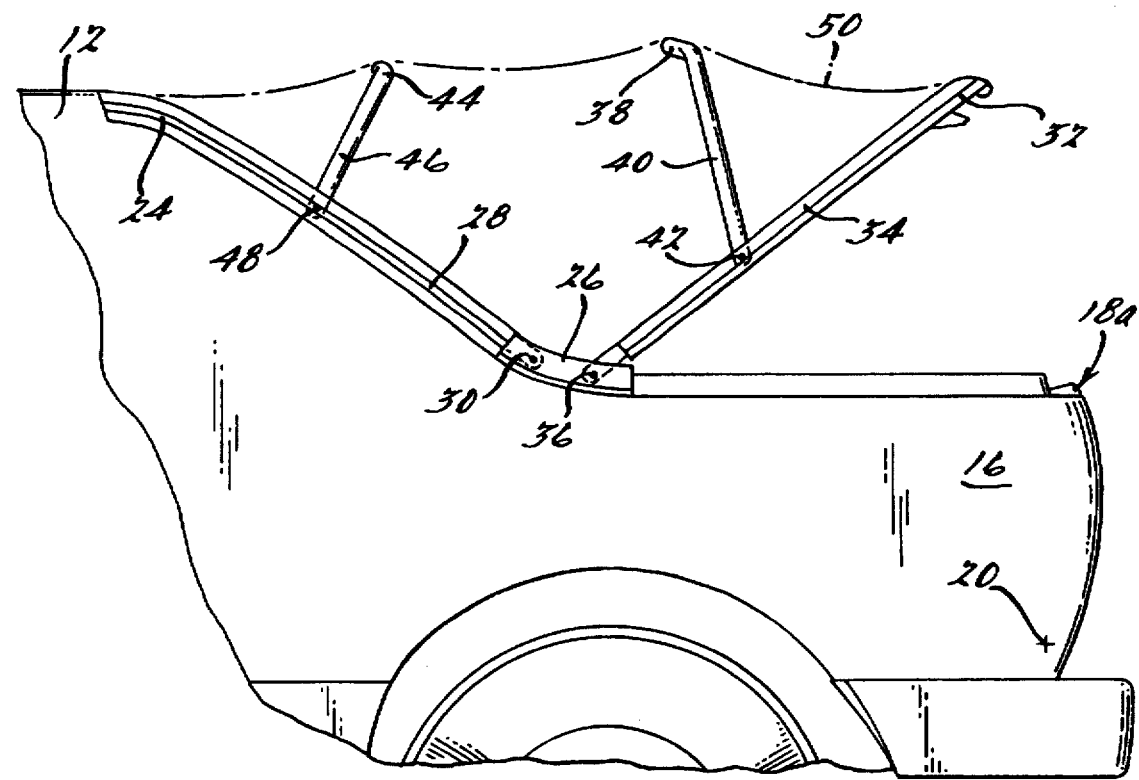
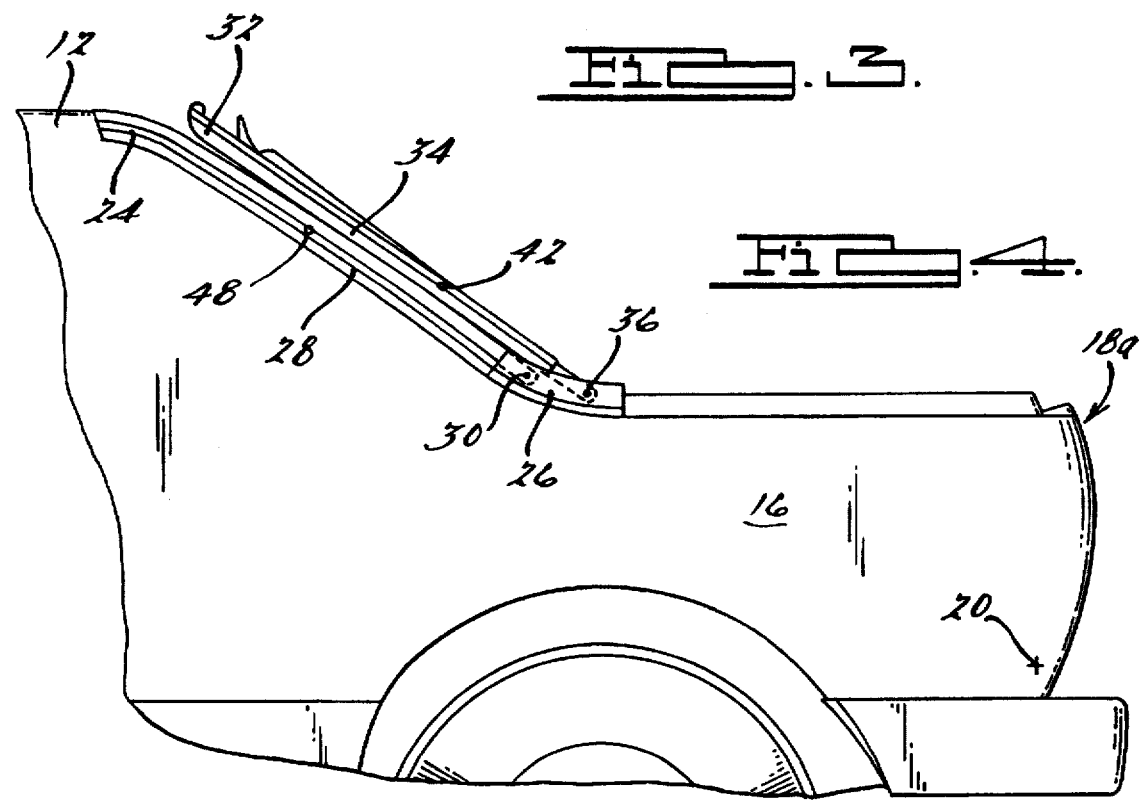

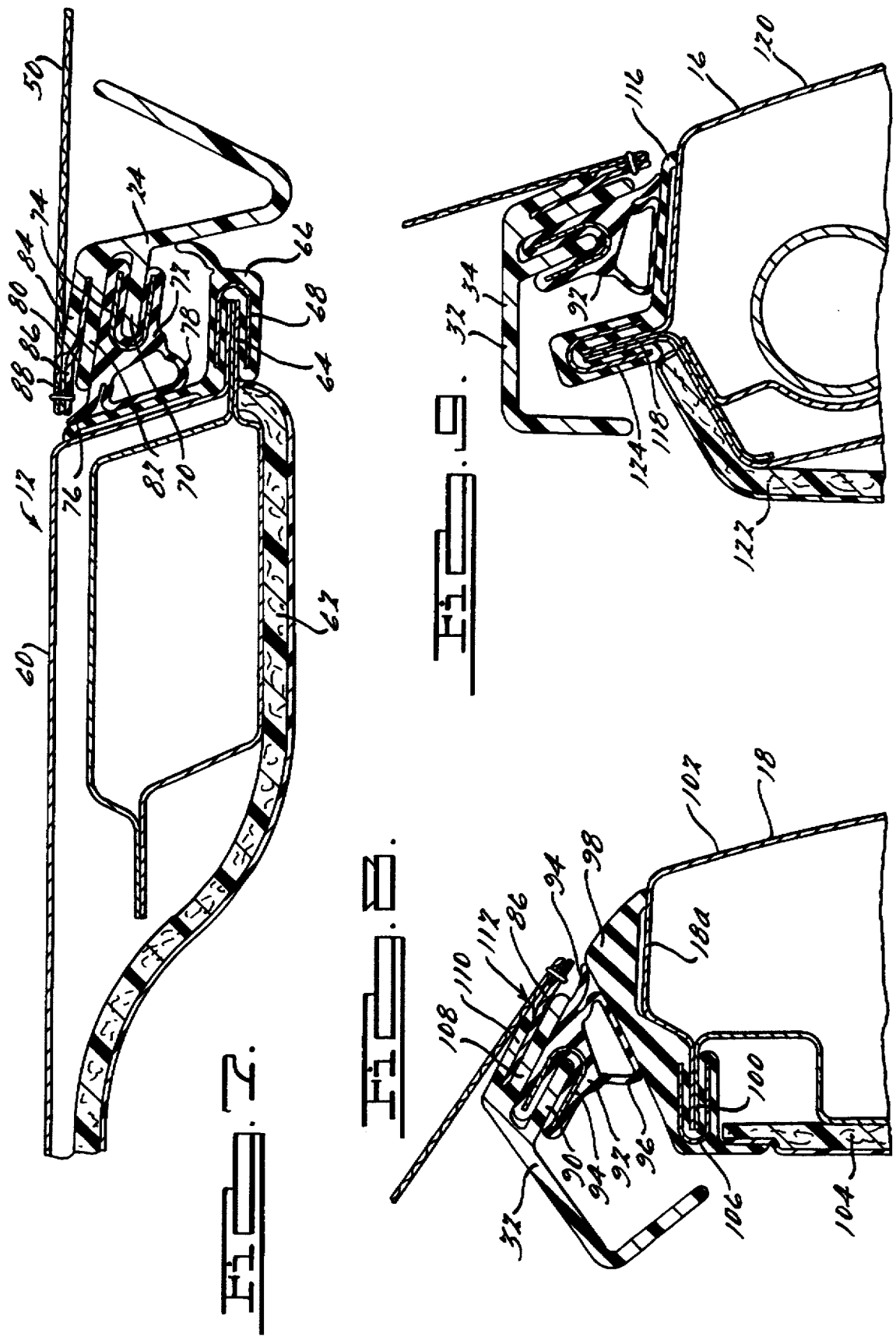

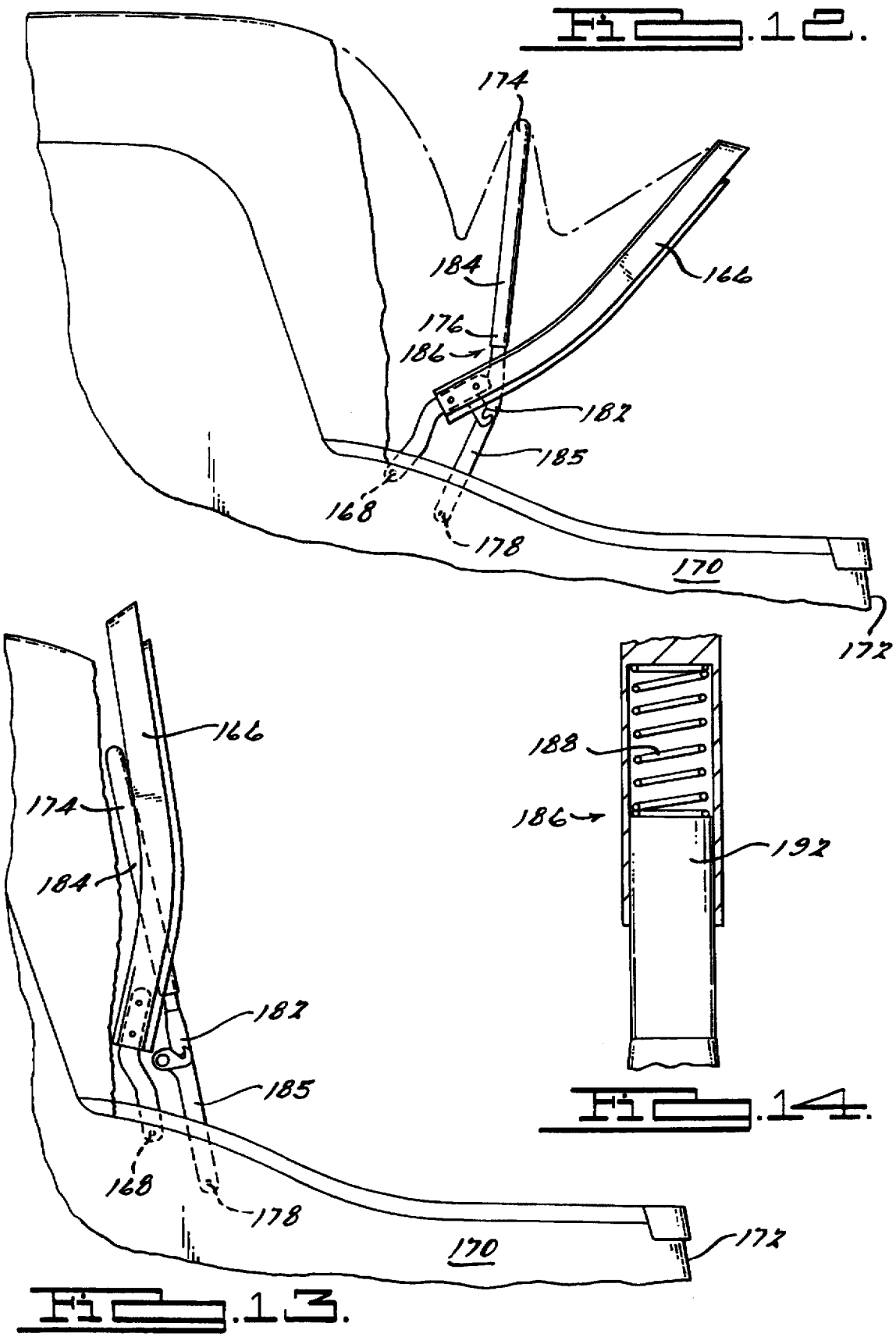

CONVERTIBLE TOP FOR A VEHICLE HAVING A REAR EGRESS

BACKGROUND OF THE INVENTION

1. Field of the Invention

This invention relates generally to automobile convertible tops, and more particularly to a convertible top design for use with a vehicle having a rear egress.

2. Background and Summary of the Invention

In the field of automobile design, convertible tops have been employed to provide the consumer with versatile styling. There are many known convertible top designs for many different types of vehicles. Generally, these convertible tops utilize various linkages and other movable elements for providing a convertible top which extends from the windshield header to the rear of the vehicle passenger compartment. The majority of these convertible tops utilize a fabric cover which is fixably attached to the vehicle body in the rear of the passenger compartment. Others use articulated rigid panels for the top cover.

Of the many known convertible top designs, only a few are applicable to a vehicle having a rear egress such as a tailgate. Of the known convertible top designs for a vehicle having a rear egress, the convertible top is generally provided with a rear panel which is held in place by snaps, zippers or other mechanical fastening means. These mechanical fastening means are generally manually released so that the rear panel can be rolled up, rolled down or removed to facilitate access to the rear of the vehicle. The mechanical fastening means associated with these types of convertible tops can be unreliable for extended use during the life of a vehicle and can also be cumbersome to use.

Accordingly, it is desirable in the art of convertible tops to provide a convertible top design which can be used with a vehicle having a rear egress and which improves the accessibility of the rear egress.

The present invention provides a convertible top for a vehicle having a rear egress including a tailgate pivotally attached to a rear of a vehicle. The convertible top includes a rear bow which rests against an upper surface of the tailgate when the top is closed and which can be lifted away from the tailgate to allow access to the inside of the rear of the vehicle without putting the top down.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a perspective view of a convertible top for a vehicle having a rear egress according to the principles of the present invention;

FIG. 2 is a side view of the convertible top shown in FIG. 1 wherein the convertible top is in the "up" position;

FIG. 3 is a side view of the convertible top shown in FIG. 1, with the rear bow of the convertible top shown in a partially forward position;

FIG. 4 is a side view of the convertible top shown in FIG. 1, with the rear bow pivoted to a fully forward position;

FIG. 7 is a cross-sectional view taken along line 7—7 of FIG. 1;

FIG. 8 is a cross-sectional view taken along line 8—8 of FIG. 1;

FIG. 9 is a cross-sectional view taken along line 9—9 of FIG. 1;

FIG. 12 is a side view of the convertible top shown in FIG. 11, with the rear bow shown in a partially forward position;

FIG. 13 is a side view of the convertible top shown in FIG. 11 with the rear bow shown in a fully forward position; and FIG. 14 is a cross-sectional view, taken along line 14—14 of FIG. 11, of a self-adjusting tensioning mechanism.

DETAILED DESCRIPTION OF THE PREFERRED EMBODIMENTS

Figure 5:
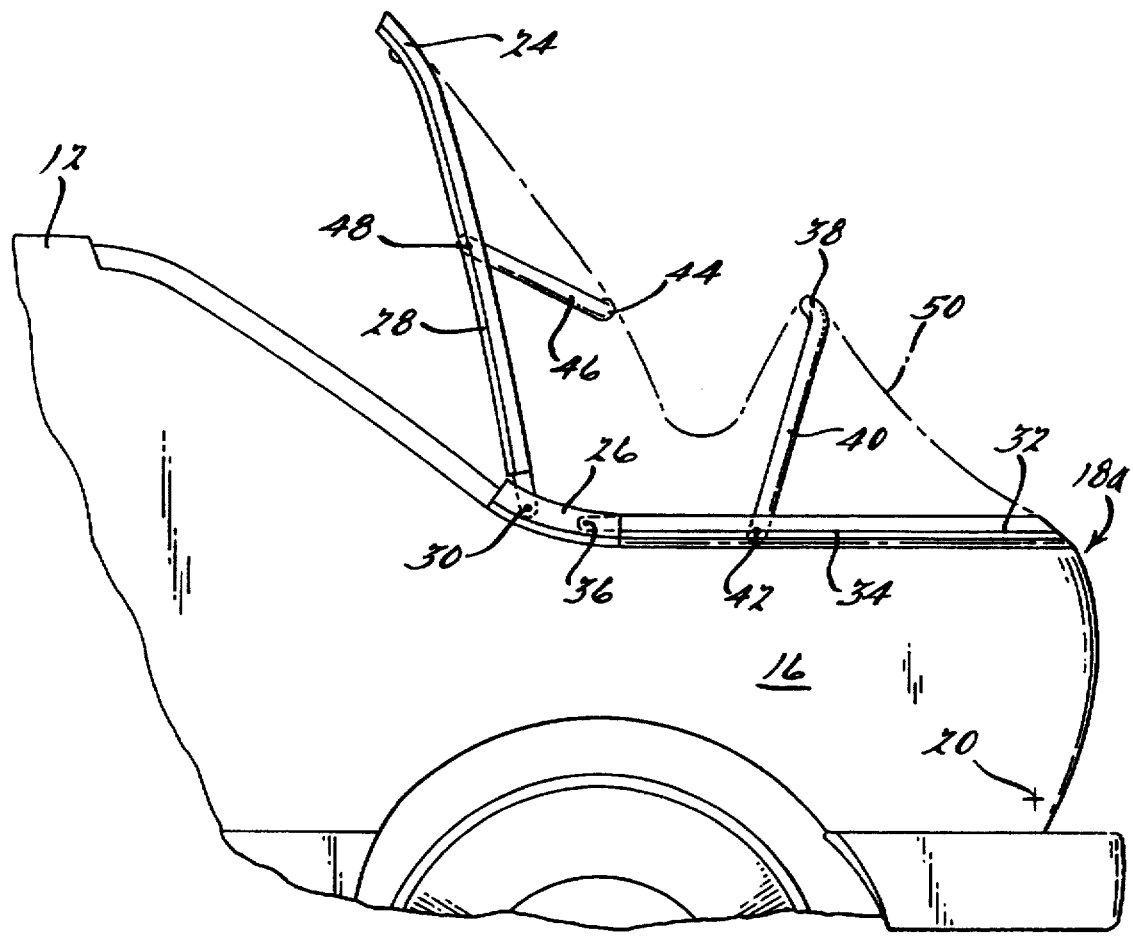
FIG. 5 is a side view of the convertible top shown in FIG. 1, with the front bow shown in a partial downward position.

As illustrated in FIGS. 1–9, the present invention is directed toward a convertible top for a vehicle having a rear egress. With reference to FIG. 1, a vehicle 10 is shown having a rigid partial roof portion 12 and a rearward soft convertible top portion 14. The vehicle 10 includes rear quarter panels 16 and a tailgate 18 which extends across a rear of the vehicle 10 between rear quarter panels 16. Tailgate 18 pivots about a horizontal axis 20, as shown in FIG. 2, to an open position. Tailgate 18 defines a rear body portion of the vehicle 10. However, the rear body portion could be a rear wall member other than a tailgate.

The soft convertible top 14 includes a front bow 24 pivotally attached to the vehicle body by a bracket member 26. Front bow 24 includes a pair of sidearms 28 which are connected to bracket member 26 by a pair of pivots 30, as shown in FIG. 2.

A rear bow 32 is also pivotally attached to bracket 26. Rear bow 32 rests against a top portion 18a of tailgate 18. Rear bow 32 includes a pair of sidearms 34 which are attached to brackets 26 at pivots 36, as shown in FIG. 2. A first intermediate bow 38 is provided with a pair of side arms 40 which are attached to rear bow 32 at pivots 42. A second intermediate bow 44 is provided with a pair of side arms 46 which are attached to front bow 24 at pivots 48. A fabric cover 50 is attached to front bow 24, intermediate bows 38, 44 and rear bow 32 in order to enclose the rear portion of vehicle 10. A backlite 52 is supported by fabric cover 50 for providing a rear window.

FIG. 2 is a side view of the convertible top 14 shown in FIG. 1. In FIG. 2, the convertible top 14 is in the "up" position wherein the front bow 24 is pivoted to the forward most position and the rear bow 32 is in the downward most position seated against the upper surface 18a of tailgate 18. A latching mechanism, not shown, is provided for fastening the front bow 24 and rear bow 32 in forward and downward positions, respectively.

FIG. 3 illustrates a side view of the convertible top 14 with the rear bow 32 being lifted to a partially upright position. In this state, the latching mechanism on rear bow 32 has been released to allow free movement of the rear bow 32.

FIG. 4 illustrates the rear bow 32 in a fully forward position wherein the intermediate bows 38, 44 have each folded with respect to rear bow 32 and front bow 24, respectively. With rear bow 32 in a fully forward position and the tailgate 18 in the down position, as shown in phantom, the rearward portion of the vehicle 10 is open. Furthermore, access through the rear of the vehicle 10 is easily obtained.

FIG. 5 is a side view of the convertible top with the front bow 24 located in a partially retracted position. In this state, the latching mechanism on front bow 24 has been released to allow free movement of the front bow 24.

Figure 6:
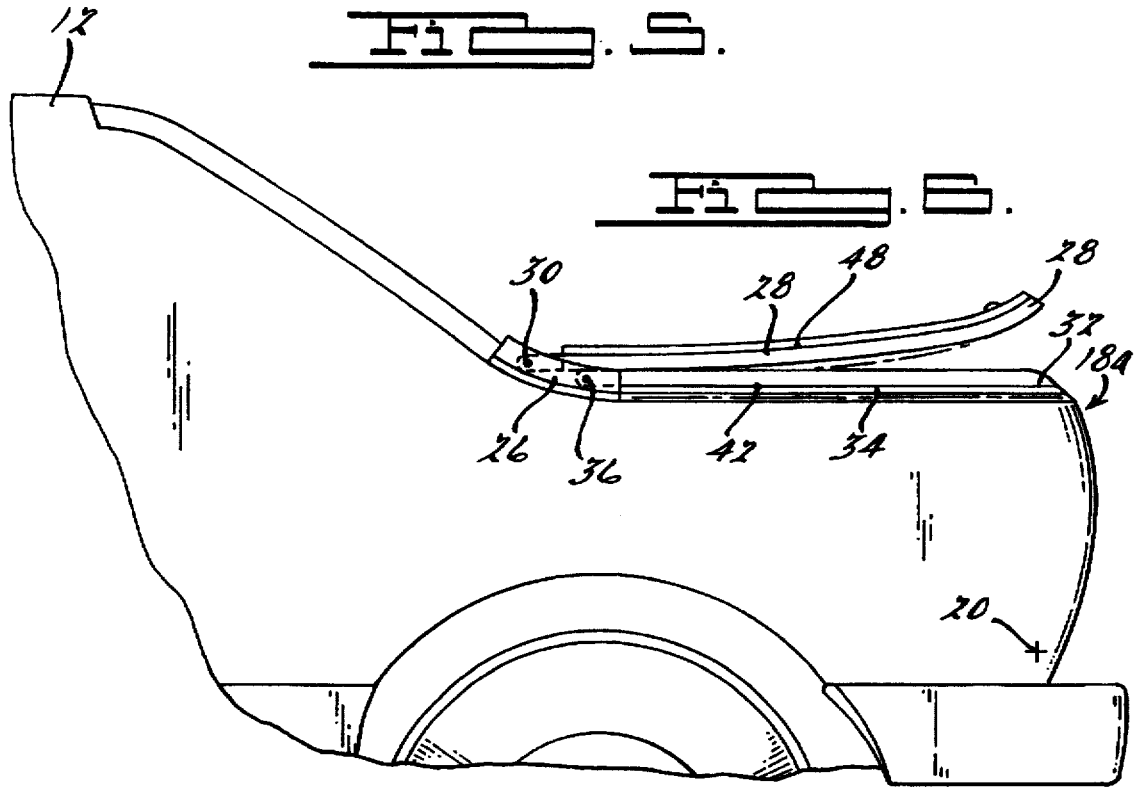
FIG. 6 is a side view of the convertible top shown in FIG. 1, with the front bow shown in a fully rearward position.

FIG. 6 is a side view of the convertible top 14 with the front bow 24 in a fully retracted position so that the rear of the vehicle 10 is open.

FIG. 7 is a cross-sectional view along line 7—7 of FIG. 1, illustrating the cross section of the front bow 24 and its intersection with the rigid roof portion 12 of vehicle 10. Roof portion 12 of vehicle 10 includes a roof outer panel 60 and a roof headliner panel 62. At the intersection of roof outer panel 60 and roof headliner panel 62 is a flanged portion 64 which supports a roof panel seal 66. Roof panel seal 66 includes a clip member 68 which is embedded in the rubber seal material and which helps to secure roof panel seal 66 to flange 64. Front bow 24 is provided with a first flange portion 70 which is provided for mounting a front bow seal member 72 thereon. Front bow seal member 72 includes a clip member 74 which is embedded in the rubber or foam material for securely fastening seal 72 to the first flange member 70. The front bow seal 72 also includes a first seal portion 76 and a second seal portion 78 which rest against roof panel seal 66. Front bow 24 is also provided with a slot 80 defined between second and third flange members 82, 84, respectively. Slot 80 is designed to receive a rigid plastic strip 86 which is fastened to the fabric cover 50. According to the present invention, the edge 88 of fabric cover 50 is folded over at least once and sown to a side of the rigid plastic strip 86.

With reference to FIG. 8, a cross sectional view along line 8—8 of FIG. 1 is shown which illustrates the engagement of the rear bow 32 with the upper surface 18a of tailgate 18. Rear bow 32 is similar to front bow 24 in that a first flange 90 is provided for supporting a rear bow seal 92. Rear bow seal 92 is provided with a clip member 94 for securing the seal 92 to the flange 90. Rear bow seal 92 includes first and second sealing portions 94, 96, respectively, which rest against a tailgate seal member 98. Tailgate seal member 98 is secured to a flange portion 100 provided between tailgate outer panel 102 and tailgate trim panel 104. A clip member 106 is provided for securing tailgate seal 98 to flange 100. Rear bow 32 is provided with second and third flanges 108, 110, respectively, which form a slot 112 for receiving rigid strip 86.

FIG. 9 is a cross-sectional view taken along line 9—9 of FIG. 1, illustrating the interface of the rear bow 32 with the rear quarter panel 16. The side arm 34 of rear bow 32 is shown having a seal 92 which is seated against quarter panel seal member 116. Quarter panel seal member 116 is attached to a flanged portion 118 located at the interface of the outer quarter panel 120 and the quarter panel trim 122. A clip member 124 is embedded in the rubber/foam seal member 116 for securing the quarter panel seal member 116 to the flange 118.

Figure 10:
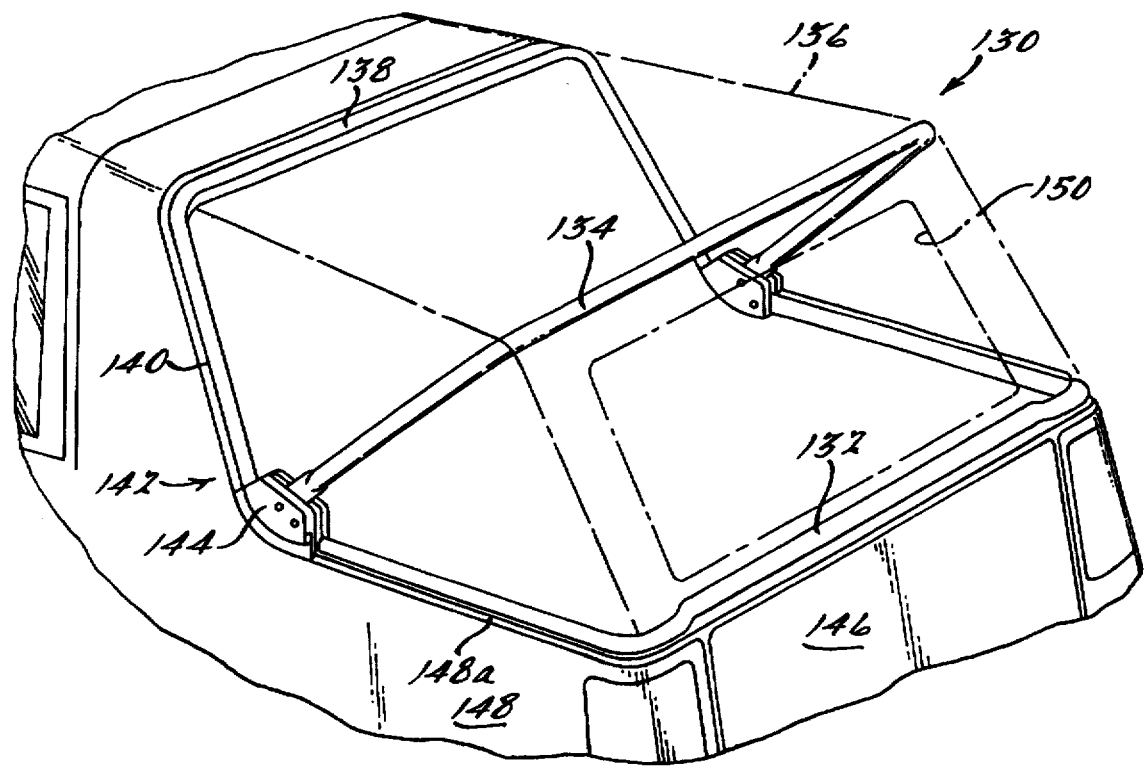
FIG. 10 is a perspective view of a vehicle having an intermediate bow and a rear bow pivotally attached to the vehicle body for supporting a fabric cover, according to a second embodiment of the present invention.

FIG. 10 illustrates a second embodiment of the present invention wherein a convertible top 130 includes a dynamic rear bow 132 and an intermediate bow 134. A fabric cover 136 is securely attached to the rear bow 132 and to the vehicle body along a roof line 138 and side surfaces 140 which extend downward from the roof line 138 of the vehicle rear open section 142. The rear bow 132 and intermediate bow 134 are both hingedly attached to a hinge bracket 144. The rear bow 132 rests on the tailgate member 146 and along the top surface 148a of rear quarter panels 140 in a manner similar to FIGS. 8 and 9 discussed above. The fabric cover 136 supports a backlite 150. Rear bow 132 is pivotable along with intermediate bow 134 to a forward position wherein access through the tailgate 146 is simplified.

Figure 11:
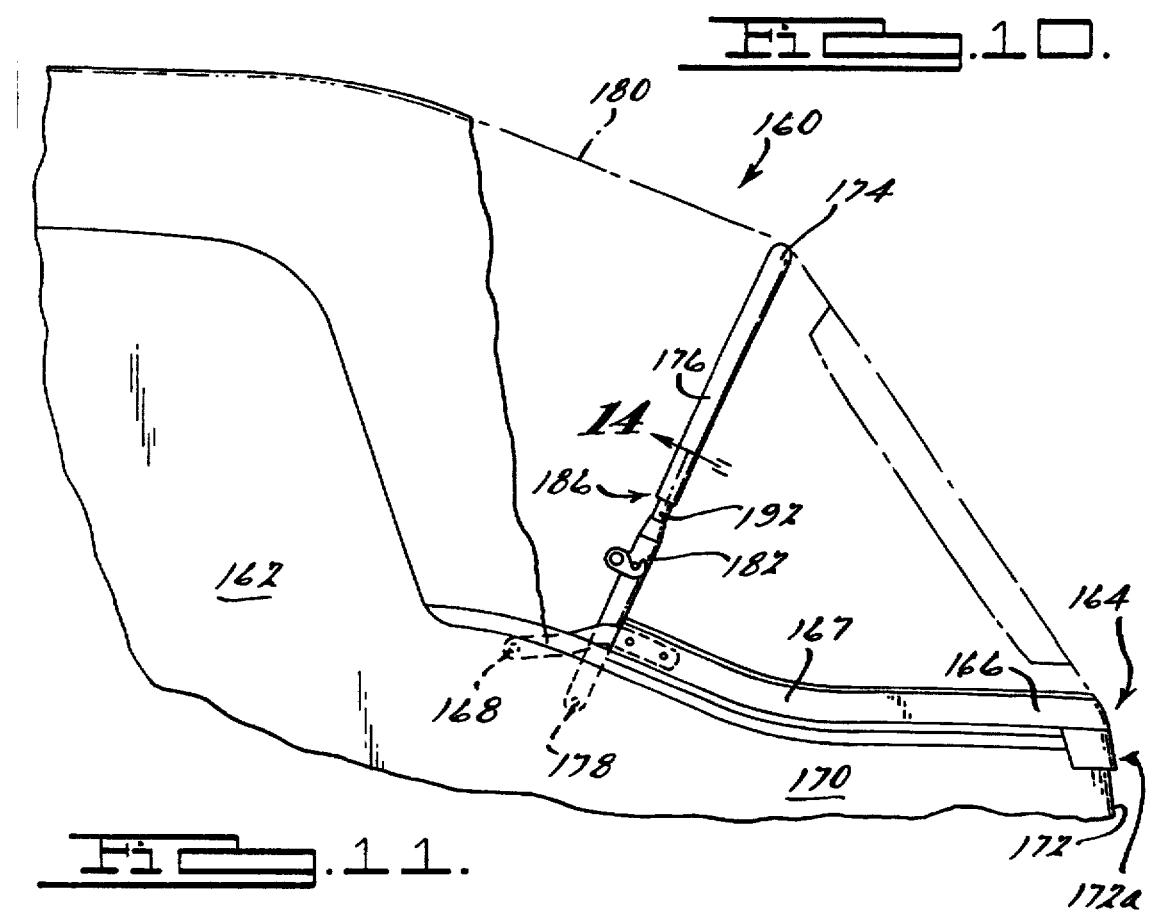
FIG. 11 is a side view of a convertible top for a vehicle having a rear egress according to a third embodiment of the present invention and with the rear bow seated against the tailgate of the vehicle.

FIG. 11 is a side view of a convertible top 160 for use with a vehicle 162 having a rear egress 164, according to a third embodiment of the present invention. The convertible top 160 is provided with a rear bow 166 having side arms 167 which are pivotally attached to the vehicle body at pivot 168. Side arms 167 of rear bow 166 rest on the upper surface of rear quarter panels 170 and on the upper surface 172a of tailgate 172. An intermediate bow 174 is provided with a pair of side arms 176 which are pivotally attached to the vehicle body at pivot 178. A conventional linkage system can be used for supporting a convertible top which extends over the entire vehicle passenger compartment up to the windshield header. A fabric cover 180 is attached to rear bow 160, intermediate bow 174 and the remaining bow members of the convertible top which extend over the top of the front portion of the vehicle passenger compartment.

Rear bow 166 is liftable to a first position as shown in FIG. 12. In FIG. 12, the intermediate bow 174 is shown with a hinge joint 182 broken so as to allow pivotable movement of an upper portion 184 of side arm 176 relative to a lower portion 185. Upper portion 184 of side arms 176 are also provided with a self-adjusting tension mechanism 186, as shown in FIG. 14. Tension mechanism 186 includes a spring 188 disposed in a cylindrical bore 190 of sidearms 176 for pressing against a telescoping member 192 and automatically tensioning fabric cover 178 of the convertible top 160.

FIG. 13 illustrates the rear bow 166 and the intermediate bow 174 pivoted to a full forward position. When the rear bow 166 is lifted off from tailgate 172 and rear quarter panels 170, easy access to the rear of the vehicle is achieved.

It should be noted that each of the bows can be provided with conventional latching mechanisms for holding them in place when the front or rear bows are pivoted to open positions. It is anticipated that the latching mechanisms should be sufficient to hold the front and rear bows in any desired position and is capable of withstanding the wind forces when the vehicle is driven with the bows in an open position. Furthermore, the present invention could be used with a hard top having rigid panels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A top for a vehicle having a rear egress including a tailgate attached to a rear of the vehicle, comprising:

a rear bow having a pair of side arms pivotally attached to a body of said vehicle, said rear bow resting against an upper surface of said tailgate and movable away from said tailgate; and a cover attached to said rear bow.

2. The top according to claim 1, further comprising an intermediate bow pivotally attached to said rear bow for supporting said cover.

3. The top according to claim 1, further comprising a front bow having a pair of side arms pivotally attached to said body of said vehicle, said front bow having a seal member designed to rest against a rearward surface of a rigid roof member.

4. The top according to claim 1, further comprising a seal member disposed along said side arms for providing a sealed relationship between an upper surface of two rear quarter panels of said vehicle.

5. A vehicle having a soft top, comprising:

a vehicle body including a pair of rear quarter panels;

a tailgate pivotally attached to a rear of said vehicle body;

a rear bow attached to said vehicle body, said rear bow being designed to rest against an upper surface of said tailgate and being movable away from said tailgate; and a cover attached to said rear bow.

6. The vehicle according to claim 5, further comprising an intermediate bow for supporting said cover.

7. The vehicle according to claim 6, wherein said intermediate bow is pivotally attached to said vehicle body.

8. The vehicle according to claim 5, wherein said tailgate pivots about a horizontal axis.

9. The vehicle according to claim 5, further comprising an intermediate bow pivotally attached to said rear bow for supporting said cover.

10. The vehicle according to claim 5, further comprising a front bow having a pair of side arms pivotally attached to said vehicle body, said front bow having a seal member which rests against a rearward surface of a rigid roof member.

* * * * *

UNITED STATES PATENT AND TRADEMARK OFFICE
CERTIFICATE OF CORRECTION

PATENT NO. : 5,775,767
DATED      : July 7, 1998
INVENTOR(S): Albert W. Harrison; George A. Corder It is certified that error appears in the above-indentified patent and that said Letters Patent is hereby corrected as shown below:

On the Title Page, under U.S. Patent Documents, reference 1,827,059, "3/1931" should be -- 10/1931 --.

On the Title Page, under U.S. Patent Documents, reference 4,541,879, "4,541,879" should be -- 4,641,879 --.

On the Title Page, under U.S. Patent Documents, reference 4,541,879, "9/1985" should be -- 2/1987 --.

On the Title Page, under Foreign Patent Documents, reference 388604, "388604" should be -- 3818604 --.

On the Title Page, under Other Publications, line 1, "Anynymously" should be -- Anonymously --.

Column 3, line 40, "sown" should be -- sewn --.

Signed and Sealed this

Twentieth Day of October, 1998

Attest:

BRUCE LEHMAN

*Attesting Officer*    *Commissioner of Patents and Trademarks*